United States Patent [19]

Freedman

[11] 3,851,258

[45] Nov. 26, 1974

[54] GATELESS LOGIC FOR PRODUCING SELECTABLE PHASE CLOCK PULSES

[75] Inventor: David Daniel Freedman, Cinnaminson, N.J.

[73] Assignee: RCA Corporation, New York, N.Y.

[22] Filed: Dec. 13, 1973

[21] Appl. No.: 424,419

[52] U.S. Cl. .................... 328/63, 307/208, 307/225, 307/262, 328/39, 328/155

[51] Int. Cl. .......................... H03k 1/00, H03k 3/04

[58] Field of Search ........... 307/208, 220, 225, 262, 307/269; 328/39, 60, 61, 63, 155

[56] References Cited

UNITED STATES PATENTS

| | | | |
|---|---|---|---|
| 3,374,359 | 3/1968 | Anderson | 307/225 R |
| 3,624,526 | 11/1971 | Silverman | 307/225 R |
| 3,798,558 | 3/1974 | Kopperschmidt et al. | 307/262 |

*Primary Examiner*—Stanley D. Miller, Jr.
*Attorney, Agent, or Firm*—Edward J. Norton; Carl M. Wright

[57] ABSTRACT

Circuit for dividing an input frequency by two having an output signal phase controlled by a signal indicating a 0° or 180° phase shift.

3 Claims, 4 Drawing Figures

PATENTED NOV 26 1974 3,851,258

GATELESS LOGIC FOR PRODUCING SELECTABLE PHASE CLOCK PULSES

The invention described herein was made in the course of or under a contract or subcontract thereunder with the Department of the Air Force.

BACKGROUND OF THE INVENTION

A selectable phase clock is useful in many timing circuits including computer and radar systems. Event timers and delays which operate by counting clock pulses from a master clock often operate at high speed. Most counters use binary flip-flops, each stage of which divides its input frequency by two.

It is desirable, even when dividing the input frequency, to change the timed interval by one clock interval, e.g., when counting an odd number of pulses of the input frequency. It is also desirable to create a symmetrical clock by an initial division by two. In such cases, it is useful to shift the divided-by-two frequency in phase by 180° to produce an output pulse coincident with the odd input pulses.

State of the art dividers operate in the several hundreds of megacycles range so that the timing pulse intervals are measured in nanoseconds. The time delay inherent in gating logic can cause substantial errors in timing sequences used at very high frequencies.

BRIEF DESCRIPTION OF THE INVENTION

Four flip-flops are coupled to a pulse source, the first flip-flop changing state with each input pulse. A control signal indicates a selected output phase and, with its complement, are applied to second and third flip-flops, which are also responsive to the true and complement output signals of the first flip-flop. The fourth flip-flop is responsive to the second and third flip-flops to produce an output signal that is one-half of the frequency of the input signals and at a phase depending on the control signal.

DETAILED DESCRIPTION OF THE INVENTION

In the illustrated embodiment, D-type flip-flops are used; the highest speed flip-flops presently commercially available are emitter-coupled D-type flip-flops. The signals used are logical zeroes and ones, the usual convention being that a high voltage level is a logical one, or TRUE, signal, and a low voltage level is a logical zero, or FALSE, signal.

Figure 1:
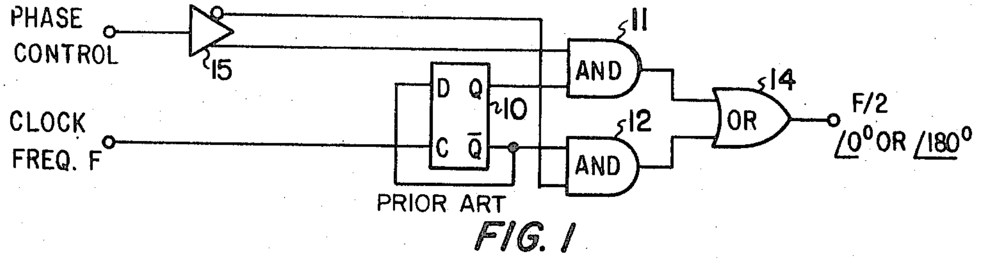
FIG. 1 is a logic diagram of a prior art circuit for producing a division by two of an input frequency at a selectable phase using logic gates.

A D-type flip-flop, such as the flip-flop 10 in FIG. 1, is in one of two states, i.e., the set state or the reset state. In the set state, the Q output signal is a logical one (high) and the $\overline{Q}$ output signal is logical zero (low). In the reset state, the Q output signal is a logical zero and the $\overline{Q}$ signal is a logical one. The D-type flip-flop changes state only during the leading edge of a clock pulse. If the D input signal is a logical one at the time of the leading edge of the clock pulse, the flip-flop will be set; if the D input signal is a logical zero, the flip-flop will be reset.

The D-type flip-flop 10 shown in FIG. 1 has its $\overline{Q}$ output signal coupled to its D input terminal. At each clock pulse, the flip-flop will assume a state depending on the value of the $\overline{Q}$ signal. Since the $\overline{Q}$ signal is the complement of the flip-flop state, the flip-flop changes state in response to each input clock pulse.

An AND gate produces an output signal of logical one only when all input signals are a logical one, and the output signal is a logical zero for all other conditions. An OR gate produces an output signal of logical one when any input signal is logical one and produces an output signal of logical zero only when all input signals are logical zero.

In FIG. 1, the flip-flop 10 is feedback coupled to operate as a divide-by-two counter stage (binary divider). The output signals on the Q and $\overline{Q}$ terminals are complementary so that one (and only one) of the AND gates 11 or 12 will be primed at any given time by the flip-flop output signals. If the input clock pulses are asymmetrical, the output signals of the flip-flop 10 will be symmetrical if the clock pulses occur at equal intervals.

A buffer-inverter 15 produces true and complement output signals, the true output signal having the same value as the input signal and the complement signal being the inverse of the input signal. The true and complement output signals of the buffer-inverter 15 are applied to the AND gates 11 and 12, respectively. An example of a circuit for implementing the function of the buffer-inverter 15 is shown in FIG. 3.

Figure 3:
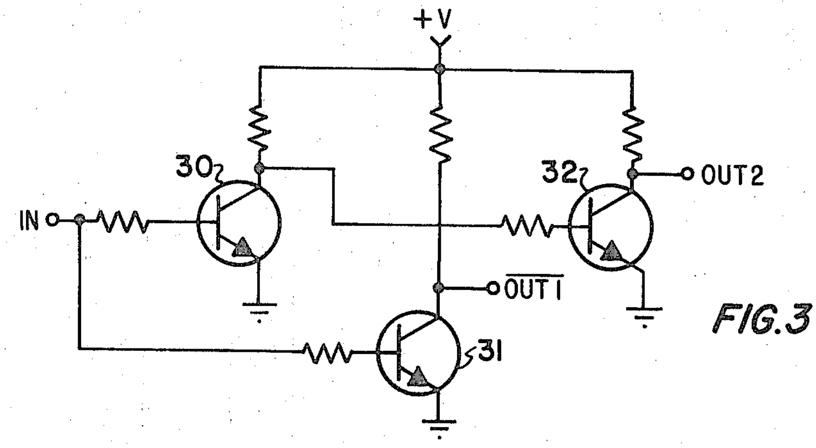
FIG. 3 is an example of a buffer-inverter.

In FIG. 3, the input signal is applied to the base of two transistors 30 and 31. The output signal appearing at the collector of each of the transistors 30 and 31 are the complement of the input signal. The complement output signal of the circuit is shown as taken at the collector of the transistor 31. The output signal from the collector of the transistor 30 is applied to the base of the transistor 32 so that the true output signal, taken at its collector, is the inverted complement of the input signal, i.e., it is the same value as the input signal. If the output signal of either transistor 31 or 32 is grounded, the other output signal is not affected. If the transistors, shown as NPN types, are replaced with PNP types and the voltage connections interchanged, either output signal can be held at +V without affecting the other output signal.

Returning to FIG. 1, the phase of the output signal from the OR gate 14 depends on the logical value of the phase control signal to the buffer-inverter 15. The output signals of the flip-flop 10, being complementary, are shifted 180° in phase with respect to one another. If the phase control signal is a logical one, the AND gate 11 is enabled by the output of the buffer-inverter 15 so that the output signal from OR gate 14 has the same phase as the Q output signal of the flip-flop. If the phase control signal has a value of logical zero, the complement output of the buffer-inverter 15 will enable the AND gate 12 so that the output signal of the OR gate 14 is in phase with the $\overline{Q}$ signal of the flip-flop 10.

If the circuit of FIG. 1 must operate at very high frequencies within close tolerances, e.g., if the pulse jitter must not exceed 100 picoseconds, then the differential delays between the AND gates 11 and 12 and the Q and $\overline{Q}$ output signals from the flip-flop 10 must not cumulatively exceed 100 picoseconds. Since it is difficult to implement the circuit using gates with such a high degree of precision, the circuit of FIG. 1 is not useful at very high frequencies when close timing tolerances are required.

Figure 2:
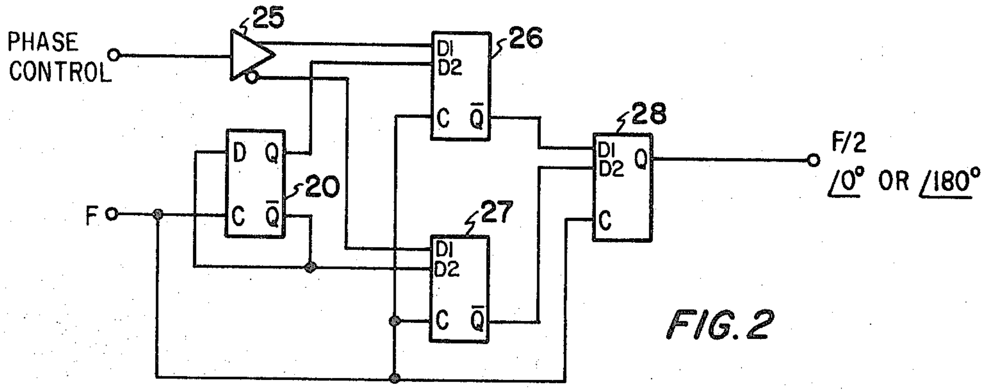
FIG. 2 is a logic diagram of one embodiment of the invention.

One embodiment of the invention as shown in FIG. 2 employs four flip-flops and no gates. The input flip-flop 20 is feedback-connected to operate as a binary divider of the input clock pulses, which are also connected to the clock inputs of three other flip-flops 26, 27 and 28.

The flip-flops 26, 27 and 28 each have two D input terminals. If either D input terminal of a particular flip-flop is a logical one at the rising edge of the clock pulse, the flip-flop will be set. In effect, the two D inputs to the flip-flop operate as if they were the inputs to an OR gate, the output of which is coupled to the D terminal of the flip-flop. (See, for example, Motorola MC 1690.)

A phase control signal is applied as the input signal of a buffer-inverter 25. The true output signal of the buffer-inverter 25 is coupled to one of the D input terminals of the flip-flop 26 and the complement signal from the buffer-inverter 25 is coupled to one of the D input terminals of the flip-flop 27.

The other D input terminal of the flip-flop 26 is coupled to the Q output signal of the flip-flop 20. The other D input terminal of the flip-flop 27 is coupled to the $\overline{Q}$ output signal of the flip-flop 20. The $\overline{Q}$ output signals from the flip-flops 26 and 27 are the D input signals for the flip-flop 28.

In operation, the circuit shown in FIG. 2 first divides the input clock via the flip-flop 20. One of the output signals of the buffer-inverter 25 is a logical one so that at each clock pulse, one of the flip-flops 26 or 27 will always be set. The other flip-flop 26 or 27 will be set and reset on alternate cycles of the clock pulses because of the output signal received from the flip-flop 20. The $\overline{Q}$ output signal of the alternating flip-flop will therefore be alternately a logical one and a logical zero to the D input terminal of the flip-flop 28, the $\overline{Q}$ signal of the constantly set flip-flop remaining a logical zero.

For example, if the phase control signal to the buffer-inverter 25 is a logical one, each clock pulse will set the flip-flop 26 because of the logical one at its D input terminal. Every other clock pulse will set the flip-flop 27 in response to a $\overline{Q}$ output signal of logical one from the flip-flop 20. The $\overline{Q}$ output signal of the flip-flop 26 will always be logical zero; the $\overline{Q}$ output signal from the flip-flop 27 will be logical one or logical zero on alternate clock pulses. The phase of the output signal from the flip-flop 28 is, because of the inversion between the input signal of the flip-flop 27 and its $\overline{Q}$ output, in phase with the Q output signal of the flip-flop 20.

If the phase control signal is changed to a logical zero, the complement output signal from the buffer-inverter 25 will provide a constant logical one as a D input signal to the flip-flop 27 so that each clock pulse will set flip-flop 27 and its $\overline{Q}$ output signal will remain a logical zero. The flip-flop 26 will be set by the clock pulse that occurs when the Q output signal from the flip-flop 20 is a logical one, i.e., on alternate cycles of the clock pulse. The $\overline{Q}$ output signal from the flip-flop 26 will therefore alternate between logical zero and logical one in response to the clock pulses so that the flip-flop 28 will be set and reset on alternate cycles but at a phase that corresponds to the $\overline{Q}$ output signal of the flip-flop 20 because of the inversion in the flip-flop 26.

Figure 4:
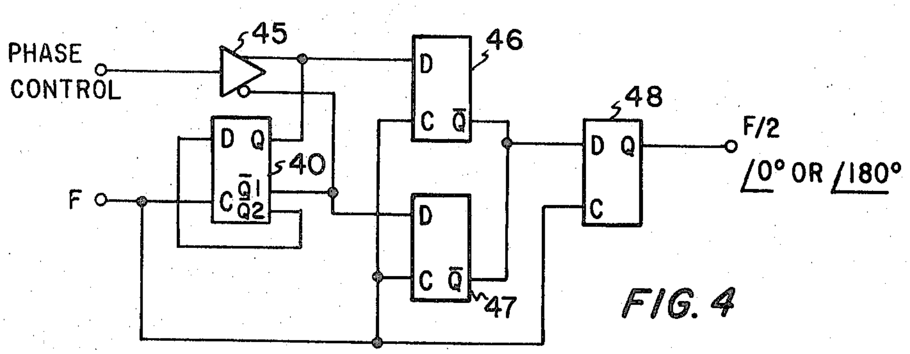
FIG. 4 is a logic diagram of another embodiment of the invention.

FIG. 4 is a logic diagram of another embodiment of the invention. The flip-flops 40, 46, 47, and 48 have a single input terminal. The flip-flop 40 has two separate $\overline{Q}$ output terminals. The $\overline{Q}$ outputs are isolated from one another by internal buffer stages so that a signal impressed on one output terminal has no effect on the signal of the other output terminal. This might be similar to the arrangement of the transistors 30 and 31 in FIG. 3 which have output signals of the same value but a signal holding the collector voltage of one transistor low would not affect the collector voltage of the other transistor as earlier described. (See, for example, Motorola MC 1654.)

The $\overline{Q}$ output signal of the flip-flop 40 can be coupled directly to the complement output signal of the buffer-inverter 45 without affecting the feedback signal to the D input terminal of the flip-flop 40 from the other $\overline{Q}$ output terminal. The Q output signal of the flip-fop 40 is coupled to the true output signal of the buffer-inverter 45.

The common junction point of the Q output signal of the flip-flop 40 and the buffer-inverter signal is coupled to the D input terminal of the flip-flop 46. The common junction of the $\overline{Q}$ signal of flip-flop 40 and the other buffer-inverter signal is coupled to the D input terminal of flip-flop 47. The $\overline{Q}$ output signals of the flip-flops 46 and 47 are coupled together and to the D input terminal of the flip-flop 48. The internal flip-flop connections are such that the operation of the flip-flop is not affected by any signal applied to the external output terminal.

The operation of the circuit in FIG. 4 is the same as that in FIG. 2. If either of the output signals coupled together are high, the signal on the common connection will be maintained at a logical one. Only if both common signals are a logical zero will the signal be maintained at a logical zero.

The circuits described and shown in FIG. 2 and in FIG. 4 disclose a circuit for performing binary division with selectable phase. The signal controlling the output phase is changed during a clock pulse period so that at the rising edge of the next clock pulse, the affected flip-flop will change state.

What is claimed is:

1. The combination comprising:

input means for pulses to be divided;

first flip-flop means coupled to said input means for producing true and complement signals that change state in response to each input pulse;

control means for producing true and complement control signals in response to a signal indicating selected phase;

second and third flip-flop means coupled to be responsive to said input pulses, to the output signals of said first flip-flop means, and to said control signals for producing an output signal in response to a pulse depending on the states of the control signals and said first flip-flop means; and fourth flip-flop means coupled to the input pulse means for producing an output signal in response to the states of said second and third flip-flop means.

2. The invention as claimed in claim 1 wherein said second flip-flop is responsive to the true signals from both said control means and said first flip-flop means and the third flip-flop means is responsive to the complemented signals from both said control means and said first flip-flop means.

3. The invention as claimed in claim 1 wherein said second flip-flop is responsive to the true signal from said control means and to the complement signals from said first flip-flop means and the third flip-flop means is responsive to the complement signal from said control means and to the true signal from said first flip-flop means.

* * * * *